(12) United States Patent
Takekawa et al.

(10) Patent No.: US 8,114,538 B2
(45) Date of Patent: Feb. 14, 2012

(54) ELECTROCATALYST FOR ELECTROCHEMICAL CELL, METHOD FOR PRODUCING THE ELECTROCATALYST, ELECTROCHEMICAL CELL, SINGLE CELL OF FUEL CELL, AND FUEL CELL

(75) Inventors: Toshihiro Takekawa, Yokosuka (JP); Hiroshi Ogawa, Yokohama (JP); Hidenobu Shiroishi, Hachioji (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 612 days.

(21) Appl. No.: 12/295,132

(22) PCT Filed: Mar. 30, 2007

(86) PCT No.: PCT/JP2007/057252
§ 371 (c)(1),
(2), (4) Date: Sep. 29, 2008

(87) PCT Pub. No.: WO2007/116842
PCT Pub. Date: Oct. 18, 2007

(65) Prior Publication Data
US 2009/0305103 A1   Dec. 10, 2009

(30) Foreign Application Priority Data

Mar. 31, 2006 (JP) ............... P2006-098328
Sep. 13, 2006 (JP) ............... P2006-248154
Mar. 27, 2007 (JP) ............... P2007-081766

(51) Int. Cl.
*H01M 8/10* (2006.01)
*H01M 4/00* (2006.01)
*H01M 4/88* (2006.01)
*H01M 4/86* (2006.01)
*H01M 8/02* (2006.01)

(52) U.S. Cl. ........................ 429/108; 502/101
(58) Field of Classification Search .................. None
See application file for complete search history.

(56) References Cited

U.S. PATENT DOCUMENTS
2007/0166601 A1  7/2007  Sano et al.
2007/0224477 A1  9/2007  Ohma et al.

FOREIGN PATENT DOCUMENTS
JP  2000-342965 A  12/2000
JP  2003-168443 A  6/2003
JP  2004-327141 A  11/2004
(Continued)

OTHER PUBLICATIONS

SciFinder search history.*
P. J. Ferreira et al., "Instability of Pt/C Electrocatalysts in Proton Exchange Membrane Fuel Cells," Journal of the Electrochemical Society, 152(11); (2005), pp. A2256-A2271.

(Continued)

*Primary Examiner* — Melvin Mayes
*Assistant Examiner* — Yun Qian
(74) *Attorney, Agent, or Firm* — Foley & Lardner LLP

(57) ABSTRACT

An electrocatalyst for an electrochemical cell of the present invention includes a metal catalyst containing metal that has a metal oxidation potential of 0.5V or higher to 1.5V or lower, and is directly involved in an electrode reaction. Further, the electrocatalyst includes an aromatic heterocyclic compound having a six-membered cyclic structure containing a heteroatom, wherein the heteroatom has a metal coordination capacity that is not directly involved in the electrode reaction. The aromatic heterocyclic compound is heterogeneously adsorbed and coordinated on a surface of the metal catalyst while interposing the heteroatom therebetween.

18 Claims, 14 Drawing Sheets

FOREIGN PATENT DOCUMENTS

| | | |
|---|---|---|
| JP | 2005-141920 A | 6/2005 |
| JP | 2005-228497 A | 8/2005 |
| JP | 2005-285695 A | 10/2005 |
| JP | 2005-317467 A | 11/2005 |
| JP | 2006-079840 A | 3/2006 |
| JP | 2006-147345 A | 6/2006 |
| WO | WO-2006/003943 A1 | 1/2006 |

OTHER PUBLICATIONS

Communication (Supplementary Partial European Search Report) EP Appln. No. 07 74 0688.2 dated Jun. 6, 2011.

Shiroishi H. et al, "Mechanism of Selective Oxygen Reduction on Platinum by 2,2'-Bipyridine in the Presence of Methanol", Langmuir, 2005, vol. 21, No. 7, pp. 3037-3043.

* cited by examiner

FIG. 7
PHENANTHROLINE 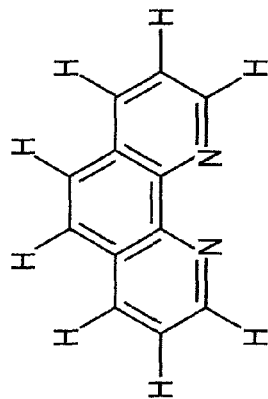 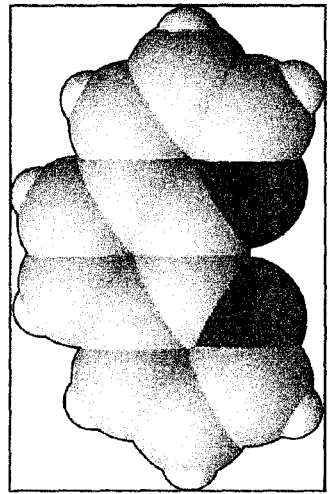
TERPYRIDINE 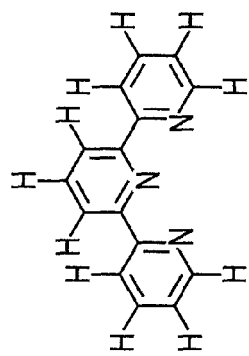 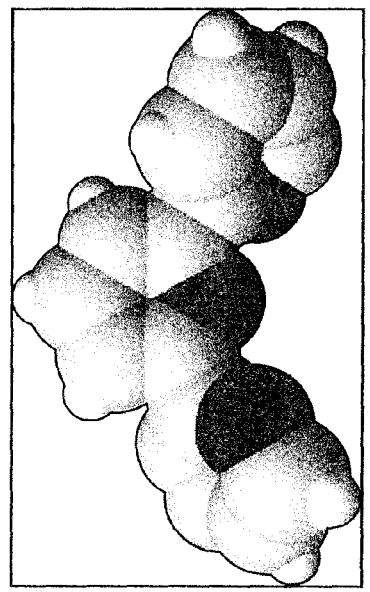
BIPYRIDINE 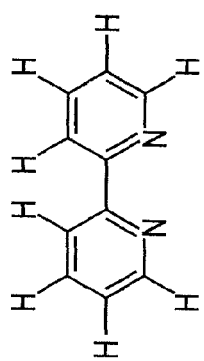 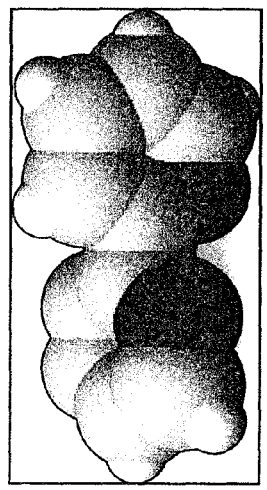

ANODE (FUEL ELECTRODE)   CATHODE (AIR ELECTRODE)

ELECTROCATALYST FOR ELECTROCHEMICAL CELL, METHOD FOR PRODUCING THE ELECTROCATALYST, ELECTROCHEMICAL CELL, SINGLE CELL OF FUEL CELL, AND FUEL CELL

TECHNICAL FIELD

The present invention relates to an electrocatalyst applicable to an electrochemical cell, to a method for producing the electrocatalyst, to an electrochemical cell, to a single cell of a fuel cell using the electrochemical cell, and to a fuel cell using the electrochemical cell. More specifically, the present invention relates to an electrocatalyst for an electrochemical cell, which is for use in the fuel cell, a lithium-ion battery, an electrical double layer capacitor, a dye-sensitized solar cell, a water electrolyzer, a hydrohalic acid electrolyzer, a salt electrolyzer, an oxygen condenser, a humidity sensor, a gas sensor and the like, to a method for producing the electrocatalyst, to an electrochemical cell, to a single cell of a fuel cell using the electrochemical cell, and to a fuel cell using the electrochemical cell.

BACKGROUND ART

A fuel cell has high power generation efficiency, and is excellent in suppressing an environmental load. Accordingly, the fuel cell is a next-generation energy supply device expected to contribute to solution of environmental problems and energy problems, which have been current large subjects in countries which consume an enormous amount of energy.

Moreover, the fuel cell is classified in accordance with types of electrolytes. In particular, a polymer electrolyte fuel cell is compact and can obtain a high output. Accordingly, researches and developments have been progressed on application of the polymer electrolyte fuel cell as an energy supply source for small-scale stationary equipment, mobile unit and portable terminal.

An electrolyte membrane for use in such a polymer electrolyte fuel cell is a solid polymer material containing hydrophilic functional groups such as sulfonic acid groups and phosphoric acid groups in polymer chains, and has properties to selectively transmit cations or anions therethrough. From this fact, the electrolyte membrane is molded into a particulate shape, a fibrous shape or a filmy shape, and is utilized for a variety of uses such as electrodialysis, diffusion dialysis and a battery diaphragm.

Moreover, at present, the polymer electrolyte fuel cell has been actively improved as power generation means in which high comprehensive energy efficiency can be obtained. Main constituents of the polymer electrolyte fuel cell are both electrodes which are an anode and a cathode, separator plates which form gas flow passages therein, and a solid polymer electrolyte membrane that separates both of the electrodes from each other. Protons generated on a catalyst of the anode move in the solid polymer electrolyte membrane, reach a surface of a catalyst of the cathode, and react with oxygen. Hence, ion conduction resistance between both of the electrodes largely affects battery performance.

In order to form the above-descried polymer electrolyte fuel cell, it is necessary to couple the catalysts of both of the electrodes and such a solid polymer electrolyte to one another. Accordingly, in general, electrocatalyst layers are used, in each of which a solution of the solid polymer electrolyte and catalyst particles are mixed together, and both are coupled to each other by coating and drying. Then, the electrocatalyst layers and the solid polymer electrolyte membrane are pressed while being heated. Such a method is used.

Moreover, for the polymer electrolyte in charge of ion conduction, in general, a perfluorosulfonic acid polymer electrolyte is used. As specific commercial products, there are mentioned Nafion (registered trademark) made by DuPont Corporation, Flemion (registered trademark) made by Asahi Glass Co., Ltd., Aciplex (registered trademark) made by Asahi Kasei Corporation), and the like.

Such a perfluorosulfonic acid polymer electrolyte is composed of perfluorocarbon principal chains and side chains having the sulfonic acid groups. Moreover, it is considered that the polymer electrolyte is separated into micro phases which are: regions containing the sulfonic acid groups as a main component; and regions containing the perfluorocarbon principal chains as a main component, and that the phase of the sulfonic acid groups forms clusters. Sites where the perfluorocarbon principal chains are aggregated contribute to chemical stability of such a perfluorosulfonic acid electrolyte membrane. Sites where the sulfonic acid groups gather to form the clusters contribute to the ion conduction.

DISCLOSURE OF INVENTION

It is difficult to produce the perfluorosulfonic acid electrolyte membrane that combines excellent chemical stability and ion conductivity as described above, and a drawback is inherent therein that production cost becomes high. Accordingly, uses of the perfluorosulfonic acid electrolyte membrane are limited, and it has been difficult to apply the perfluorosulfonic acid electrolyte membrane to the polymer electrolyte fuel cell expected as a power source for the mobile unit.

Moreover, the current polymer electrolyte fuel cell is operated within a relatively low temperature range from room temperature to approximately 80° C. This restriction on the operation temperature results from that it is desirable to use the fuel cell substantially at 100° C. or lower since a fluorine film for use therein has a glass transition point around 120 to 130° C., and in a temperature range higher than the glass transition point, it becomes difficult to maintain an ion channel structure that contributes to proton conduction. Moreover, this restriction also results from that the fuel cell as a device is increased in scale since pressurization becomes necessary when the operation temperature exceeds 100° C. as the boiling point of water since the water is used as a proton conducting medium.

However, even if the operation temperature is equal to or lower than 100° C., there is a problem that a reaction area of electrocatalyst metal is reduced in the polymer electrolyte fuel cell. Specifically, in a temperate range equal to or higher than the room temperature, in the electrocatalyst on the cathode electrode (oxidant electrode) particularly exposed to a high potential, the electrocatalyst metal such as platinum is oxidized and dissolved, and the reaction area is reduced. Therefore, the conventional technology has not been able to deal with the dissolution of the catalyst, and it has been an important subject to ensure durability of the fuel cell (refer to Japanese Patent Unexamined Publication No. 2003-168443).

In order to deal with these subjects, a variety of contrivances have been examined. For example, there have been taken such measures for arranging a large amount of the catalyst metal, increasing an effective reaction area, and so on in a region where the oxidation and dissolution of the catalyst metal are relatively prone to occur (refer to Japanese Patent Unexamined Publication No. 2005-285695). Moreover, in an oxygen electrode of a direct fuel type fuel cell, it has been proposed to suppress reaction selectivity in an oxidation reaction of alcohol by using an aromatic heterocyclic compound as an additive (refer to Japanese Patent Unexamined Publication No. 2005-228497).

However, in the technology described in Japanese Patent Unexamined Publication No. 2005-285695, such measures for locally increasing the amount of catalyst metal and changing specifications of the catalyst metal are involved, and accordingly, there is a possibility that cost of the electrocatalyst containing platinum as a main component may be increased. Moreover, in the technology described in Japanese Patent Unexamined Publication No. 2005-228497, such elution of the catalyst metal has not been taken into consideration.

Moreover, there has been proposed a technology for further containing a platinum ion trapping agent, which is capable of trapping platinum ions, in an electrocatalyst layer for a polymer electrolyte fuel cell, which contains a catalyst active material containing platinum supported on a conductive substrate, and contains a proton conductive polymer (refer to Japanese Patent Unexamined Publication No. 2006-147345). In such a way, platinum is prevented from flowing out with time from the electrocatalyst layer of the polymer electrolyte fuel cell.

However, in this direct fuel type fuel cell, though platinum can be prevented from flowing out from the electrocatalyst layer, there has been no change in that the fuel cell is used while avoiding the elution of platinum at an oxidation peak (around 0.7 to 0.8V) of platinum.

The present invention has been made in consideration for such problems as described above, which are inherent in the conventional technologies. It is an object of the present invention to provide an electrocatalyst for an electrochemical cell, which is capable of enhancing the durability against the dissolution of the catalyst metal, a method for producing the electrocatalyst, the electrochemical cell, a single cell of a fuel cell using the electrochemical cell, and a fuel cell using the electrochemical cell.

An electrocatalyst for an electrochemical cell according to a first aspect of the present invention includes: a metal catalyst which contains metal having a metal oxidation potential of 0.5V or higher to 1.5V or lower, the metal being directly involved in an electrode reaction; and an aromatic heterocyclic compound which has a six-membered ring structure containing a heteroatom, the heteroatom having a metal coordination capacity that is not directly involved in the electrode reaction, wherein the aromatic heterocyclic compound is heterogeneously adsorbed and coordinated on a surface of the metal catalyst while interposing the heteroatom therebetween.

An electrocatalyst for an electrochemical cell according to a second aspect of the present invention includes: a metal catalyst which contains metal that is directly involved in an electrode reaction; and an aromatic heterocyclic compound which has a six-membered ring structure containing a heteroatom, the heteroatom having a metal coordination capacity that is not directly involved in the electrode reaction, wherein, in comparison with a metal catalyst with which the aromatic heterocyclic compound does not exist, a rising potential in an oxidation reaction of the metal catalyst itself, which is observed in a current-potential behavior, is shifted to a high potential side, or an oxidation peak of the metal catalyst itself is reduced.

A method for producing an electrocatalyst for an electrochemical cell according to a third aspect of the present invention includes: dissolving the aromatic heterocyclic compound in a solvent into a predetermined concentration; dispersing the metal catalyst, on which the metal having the metal oxidation potential of 0.5V or higher to 1.5V or lower is supported, into a solution in which the aromatic heterocyclic compound is dissolved; mixing and stirring the solution into which the metal catalyst is dispersed; and taking out and drying the metal catalyst on which the aromatic heterocyclic compound is adsorbed and coordinated.

BRIEF DESCRIPTION OF DRAWINGS

FIG. 7 is schematic views showing structures of bipyridine, terpyridine and phenanthroline.

BEST MODE FOR CARRYING OUT THE INVENTION

Figure 1:
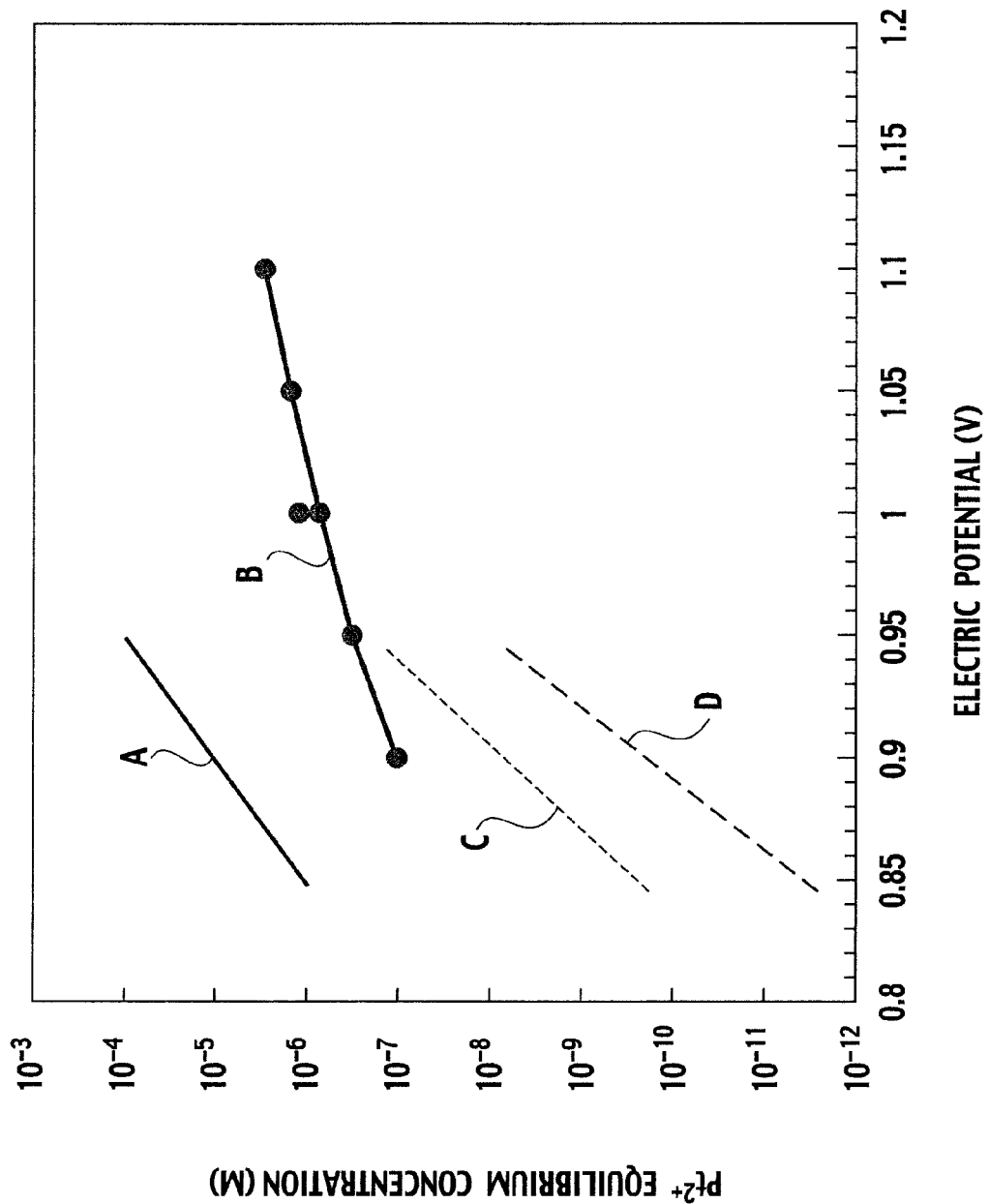
FIG. 1 is a graph showing elution behaviors of platinum at an electric potential of 0.8V or higher.

A description will be made below in detail of an electrocatalyst for an electrochemical cell according to an embodiment of the present invention while taking, as an example, an application mode thereof to a fuel cell. Note that, in this description and the drawings, "%" added to values of concentrations, contents, loadings and the like represents a mass percentage unless otherwise specified.

The electrocatalyst for an electrochemical cell according to this embodiment is composed of an aromatic heterocyclic compound and a metal catalyst. This aromatic heterocyclic compound is heterogeneously adsorbed and coordinated on a surface of the metal catalyst while interposing a heteroatom of the aromatic heterocyclic compound therebetween.

Here, as the aromatic heterocyclic compound, one having a six-membered ring structure is used. Moreover, the heteroatom in the aromatic heterocyclic compound is typically a nitrogen atom having a metal coordination capacity that is not directly involved in an electrode reaction of the fuel cell. Note that a similar effect can be obtained even if the heteroatom is an oxygen atom, a sulfur atom, a phosphorus atom or a halogen atom besides the above-described nitrogen atom.

Meanwhile, the metal catalyst contains metal that has a metal oxidation potential of 0.5V or higher to 1.5V or lower, and is directly involved in the electrode reaction of the fuel cell.

Note that the above-described metal coordination capacity refers to a capacity that the heteroatom is heterogeneously adsorbed and coordinated on active sites of platinum and the like in the metal catalyst.

With such a configuration, dissolution and elution of such a catalytic component in the metal catalyst is suppressed. Specifically, the aromatic heterocyclic compound as organic material is coordinated on the surface of the metal catalyst. Accordingly, in comparison with a metal catalyst that is untreated, a rising potential in an oxidation reaction of the metal catalyst itself, which is observed in a current-potential behavior, is shifted to a high potential side, and an oxidation peak of the metal catalyst itself is reduced. Hence, though initial catalyst electrode characteristics are somewhat decreased in some case, durability of the fuel cell after a long-term use thereof is enhanced, and accordingly, a lifetime thereof can be extended.

In the electrocatalyst for an electrochemical cell according to this embodiment, it is preferable that metal as the catalytic component, which has the above-described oxidation potential, be metal belonging to the fourth to sixth periods. More preferably, the metal is metal belonging to the groups IV to XII, and particularly preferably, the metal is metal belonging to the groups VI to XI. The above-described metal catalyst can typically include platinum (Pt), rhodium (Rh), or palladium (Pd), and those according to arbitrary combinations of these.

Here, a description will be made of the dissolution and elution of the catalytic component in the metal catalyst by examples where the metal is platinum (Pt), palladium (Pd), gold (Au) and ruthenium (Ru).

Research on the Pt elution was progressed in detail from 1960's to 1980's, and a plurality of research results have been reported on an elution mechanism of Pt. It is said that platinum oxide species have certain solubility in a solution, and accordingly, it is considered that Pt is dissolved via a state of platinum oxide.

Figure 2:
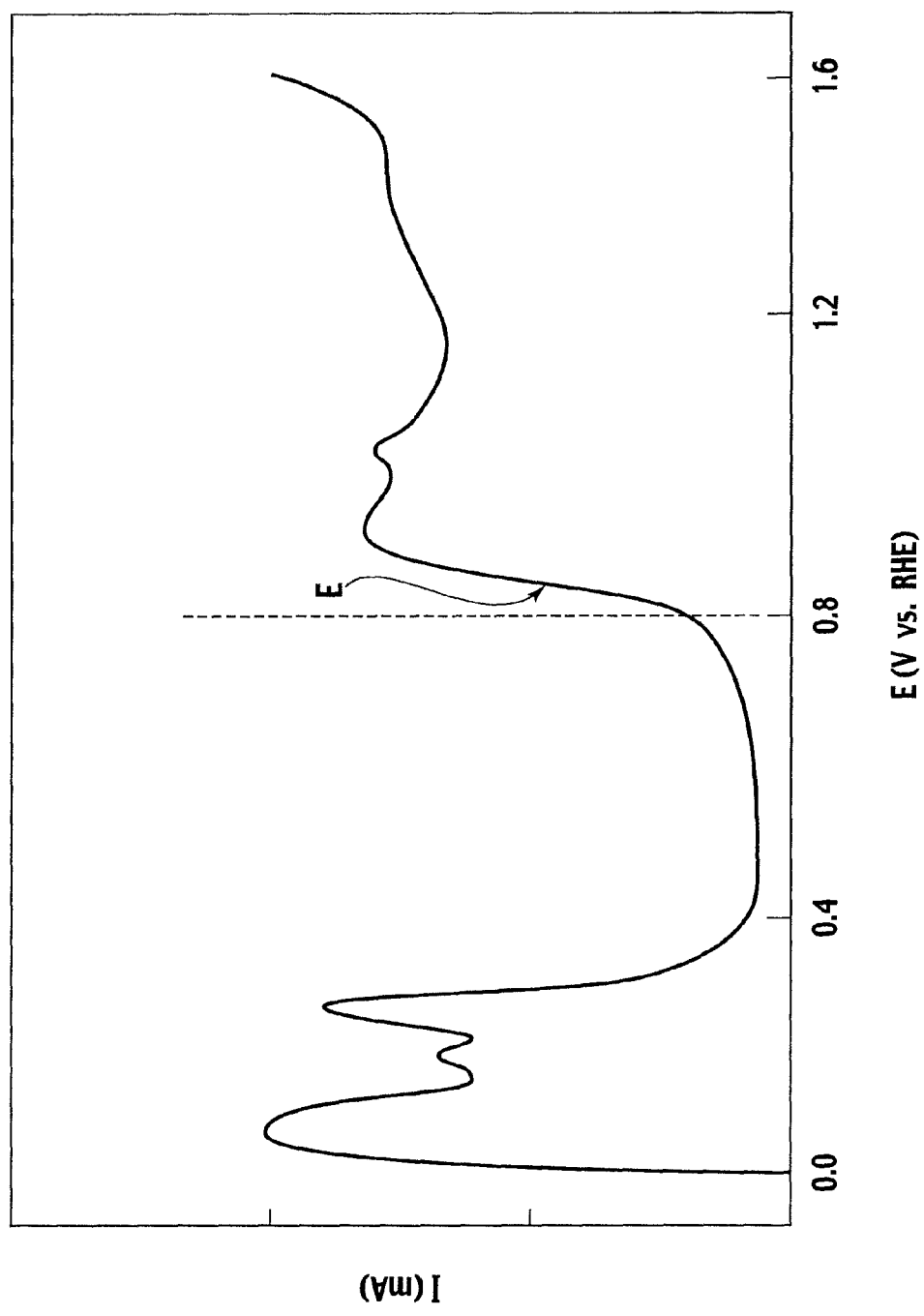
FIG. 2 is a graph showing a current-potential behavior of Pt.

Elution behaviors of platinum in an acidic electrolyte at a potential of 0.8V or higher are as shown in FIG. 1. It is understood that elution amounts are increased as the potential becomes higher. This is considered to be because, as shown in FIG. 2, formation of an oxide ($PtO_x$) of Pt becomes a primary reaction, and the formation of the oxide is accelerated particularly when the potential becomes higher than 0.8V from which the oxidation peak of Pt rises (refer to reference symbol E in FIG. 2). This also coincides with such a thought that the elution of Pt is accelerated by the fact that the above-mentioned Pt oxide is dissolved in the acidic electrolyte. Accordingly, it is considered that it is possible to suppress the elution of Pt if the formation of the oxide of Pt can be suppressed. Note that FIG. 1 is one extracted from P. J. Ferreira et al., *J. Electrochem. Soc.,* 152. A2256 (2005). Moreover, in FIG. 1, reference symbol A denotes data obtained by Bindra, and indicates an elution amount of platinum at 196° C., which was measured in phosphoric acid. Reference symbol B denotes data obtained by Ferreira et al., and indicates an elution amount of platinum at 80° C., which was measured in a proton exchange membrane fuel cell (PEM). Reference symbol C denotes data estimated by Ferreira et al. and indicates an estimated value of an elution amount of platinum at 80° C., which was interpolated based on data thereof at 25° C. and 196° C. Reference symbol D denotes data obtained by Pourbaix, and indicates an elution amount of platinum at 25° C., which was measured in the phosphoric acid.

Figure 3:
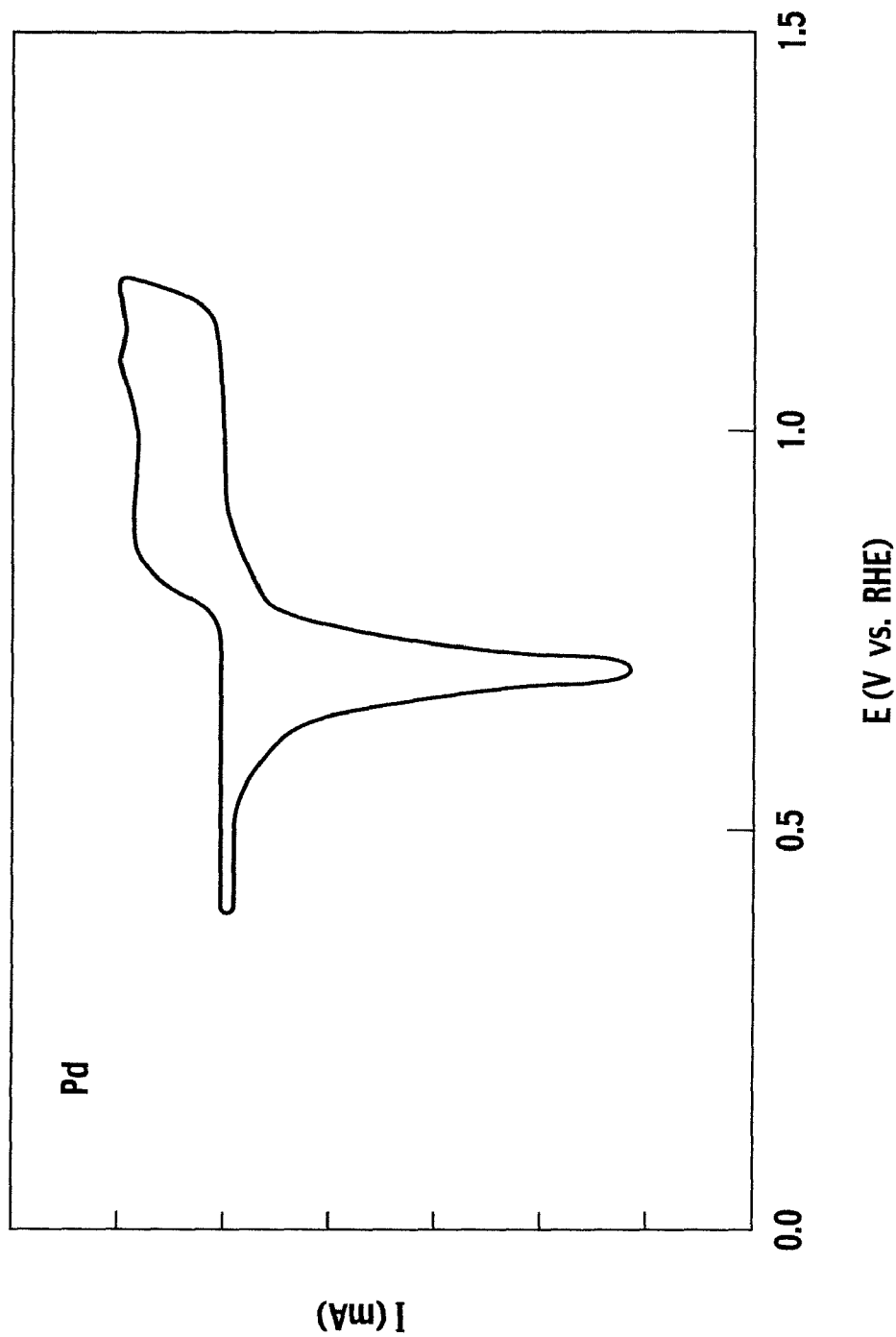
FIG. 3 is a graph showing a current-potential behavior of Pd.
Figure 4:
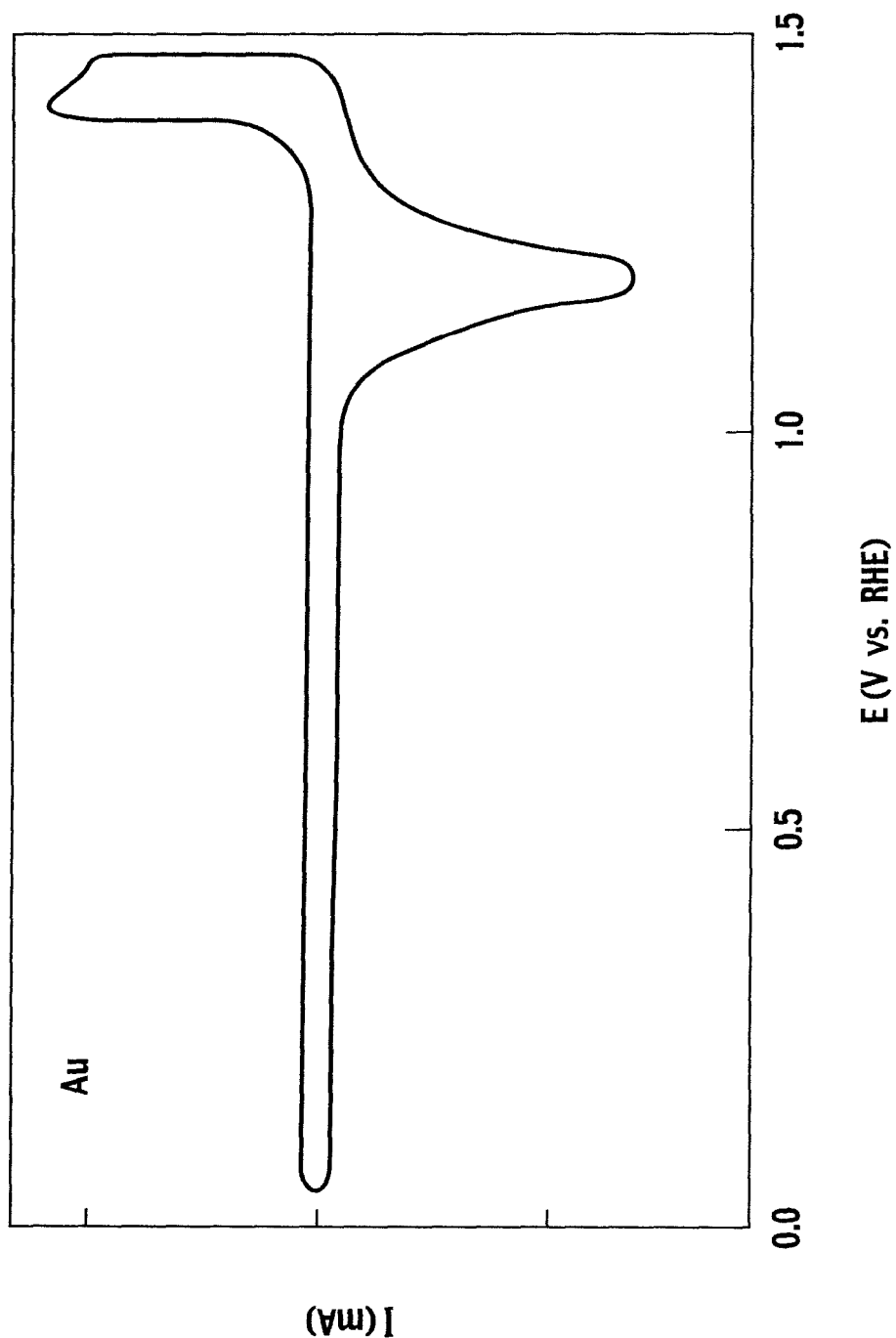
FIG. 4 is a graph showing a current-potential behavior of Au.
Figure 5:
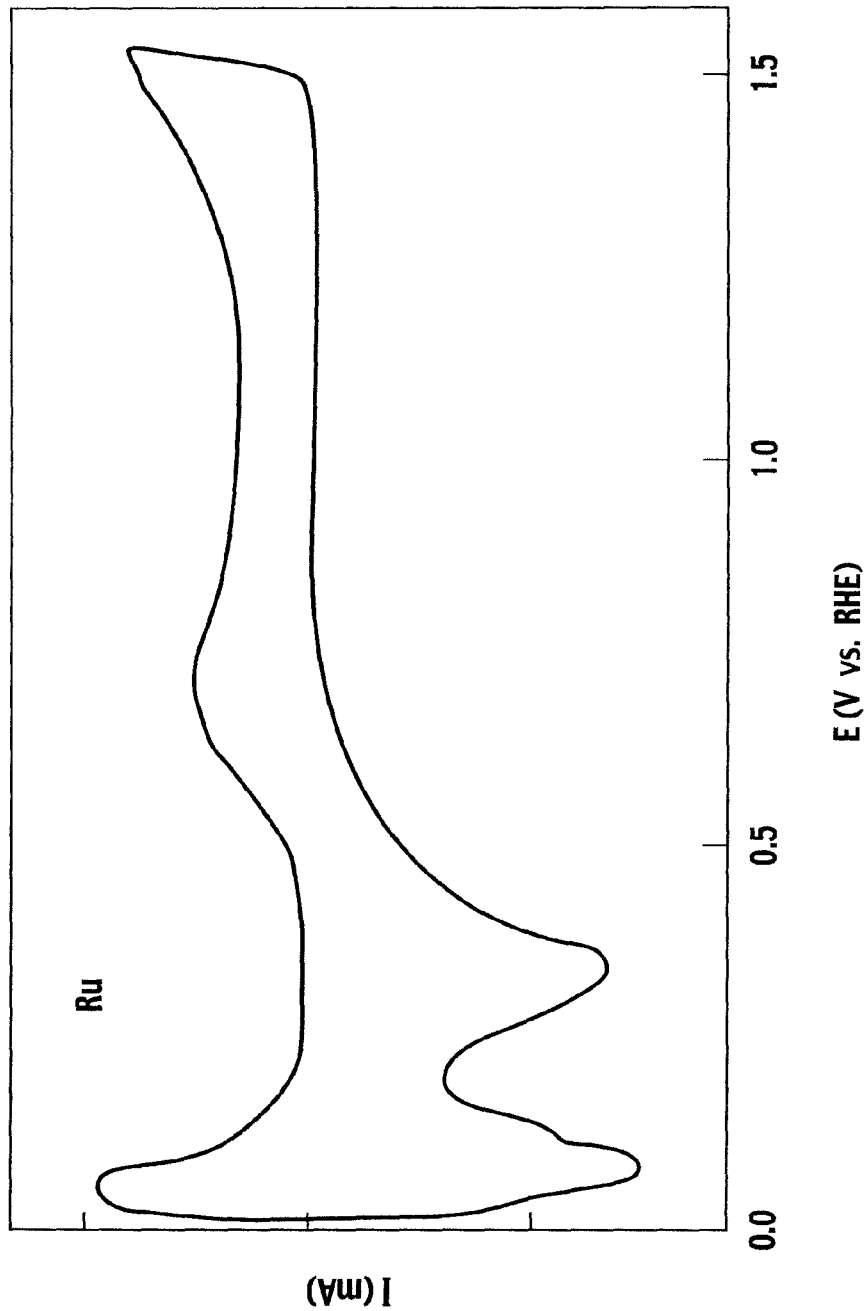
FIG. 5 is a graph showing a current-potential behavior of Ru.

It is predicted that energy is high in spots where Pt is prone to be oxidized, and it is considered that, when the organic compound is interposed in platinum oxide, the organic compound is selectively adsorbed and coordinated on sites which become edges and kinks. Accordingly, it is assumed that the rising of the oxidation peak of Pt on which the organic compound is adsorbed is shifted to the high potential side, whereby the oxidation of Pt is suppressed. Note that FIGS. 3 to 5 show elution behaviors of Pd, Au and Ru, and it is understood that there are oxidation potentials of the metals within the range from 0.5V or higher to 1.5V or lower in a similar way.

Figure 6:
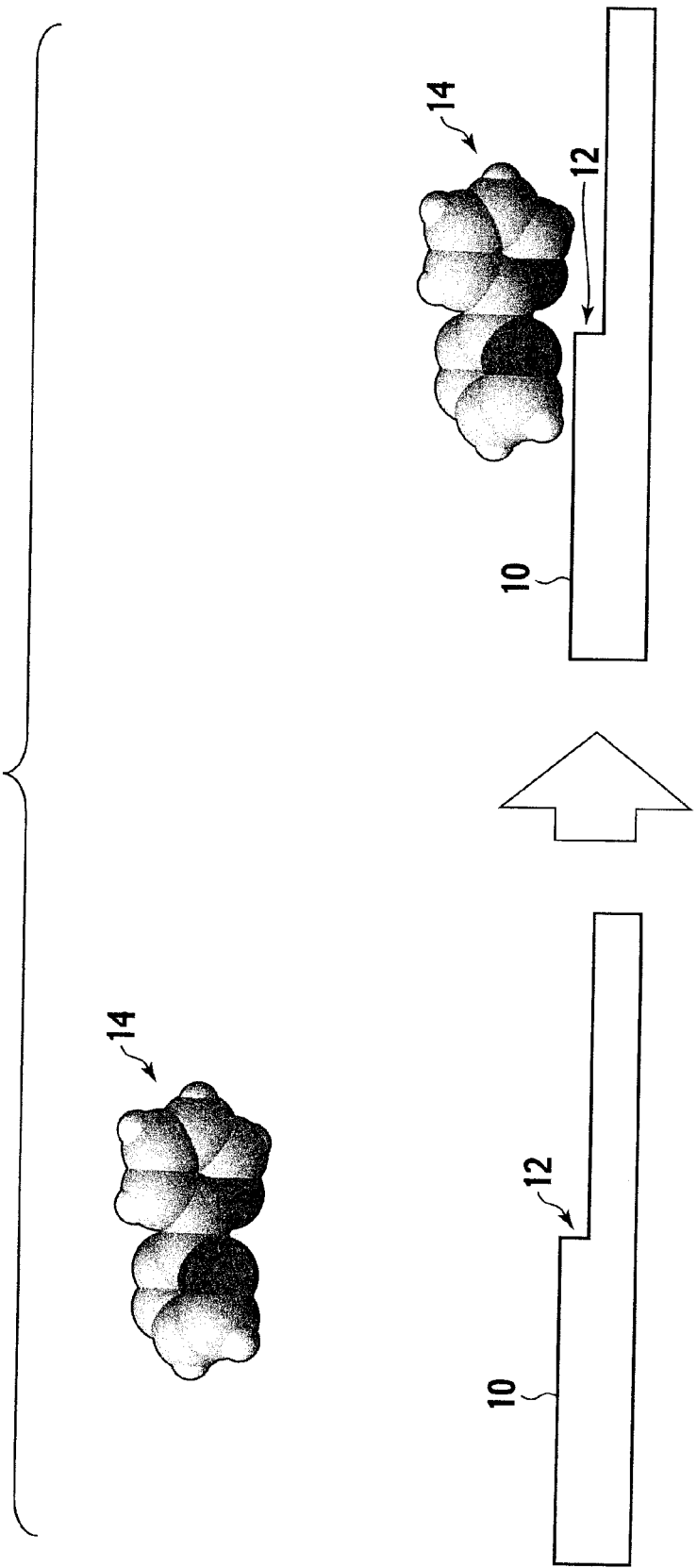
FIG. 6 is a schematic view showing a state where bpy is adsorbed to a surface of Pt.

Moreover, a detailed mechanism of preventing the dissolution and elution of Pt has not been proven at the current point of time; however, the mechanism can be guessed as follows. Specifically, it is considered that the aromatic heterocyclic compound containing the heteroatom having the metal coordination capacity that is not directly involved in the electrode reaction of the fuel cell coexists on the surface of Pt in the metal catalyst while interposing the heteroatom therebetween, whereby the process where Pt is oxidized is suppressed, and the dissolution of Pt is suppressed. In other words, it is considered that the aromatic heterocyclic compound is preferentially coordinated on such sites of Pt, where activity is particularly high, in the metal catalyst, and covers Pt. Hence, if it is considered that the dissolution and elution of Pt is started from the formation of an oxide of platinum, which occurs on such high-activity sites, as a starting point, then it can be assumed that the aromatic heterocyclic compound is selectively adsorbed to the high-activity sites, whereby the formation of the platinum oxidant is suppressed, and as a result, the dissolution and elution of platinum is suppressed. For example, it is considered that bipyridine 14 is adsorbed to a step (kink) 12 as a high-activity site of a Pt surface 10 as shown in FIG. 6, and prevents oxidation of a region of the step (kink) 12, whereby radical oxidation of the entire Pt can be suppressed, and as a result, the elution of the Pt catalyst can be prevented.

In the electrocatalyst for an electrochemical cell according to this embodiment, it is preferable that the above-described metal catalyst be at least one selected from the group consisting of platinum, rhodium and palladium, and/or alloys of these. Specifically, for example, there are mentioned metal catalysts using platinum powder, platinum-supported carbon, platinum-ruthenium alloy-supported carbon, platinum-iron alloy-supported carbon, platinum-cobalt alloy-supported carbon, a platinum black electrode, a platinum mesh, platinum-rhodium alloy-supported carbon, platinum-palladium alloy-supported carbon, palladium-rhodium alloy-supported carbon, and the like.

Moreover, besides the above, as the metal catalysts, there are mentioned those belonging to the fourth to sixth periods, preferably those belong to the groups IV to XII, more preferably those belonging to the groups VI to XI. Typically, gold (Au), silver (Ag), osmium (Os), iridium (Ir) and the like can be used.

Note that, from a viewpoint of maintaining electron conductivity, for example, carbon fine particles (carbon black, fullerene and the like), fine carbon fibers (carbon nanotube and the like), tungsten carbide and molybdenum carbide can be used in combination with the above-described metal catalyst. At this time, even if an applied voltage is as relatively high as 1.2V, the dissolution and elution amount of the catalyst components (Pt, Rh, Pd and the like) in the metal catalyst can be suppressed, and the catalyst can be applied effectively to a cathode electrode for the fuel cell.

Moreover, the above-described aromatic heterocyclic compound just needs to contain a six-membered ring in which the heteroatom is such an atom having the metal coordination capacity that is not directly involved in the electrode reaction of the fuel cell. For example, if the aromatic heterocyclic compound is a pyridine derivative, then the above-described effect can be exerted. Typically, the aromatic heterocyclic compound can be used by being selected as appropriate from bipyridines, terpyridines or phenanthrolines, and derivatives according to arbitrary combinations of these. FIG. 7 shows schematic views of structures of bipyridine, terpyridine and phenanthroline. At this time, bridge structures formed by the polycyclic aromatic compounds ensure catalytic-function sites of the catalyst components (Pt, Rh, Pd and the like), and can exert a high oxygen reduction performance. Moreover, the bridge structure can suppress the above-described dissolution and elution mechanism.

Furthermore, as the above-described aromatic heterocyclic compound, it is particularly suitable to use 2,2'-bipyridine as a bipyridine derivative. As other specific examples, there can be used 2,6-di(2-pyridyl)pyridine, 1,10-phenanthroline, 4,7-biphenyl-1,10-phenanthroline, 1,7-phenanthroline, bathocuproin, bathocuproin sulfonate, and the like.

Here, a description will be made of an adsorption behavior of the aromatic heterocyclic compound. As the aromatic heterocyclic compounds, solutions were prepared, in which 2,2'-bipyridine (bpy), 1,10-phenanthroline (phen) and $\alpha,\alpha',\alpha''$-terpyridine (terpy) were dissolved into a sulfuric acid solution with a predetermined concentration (1.0 M). The Pt electrode was immersed into the prepared solutions, and each state where the Pt electrode was covered with the aromatic heterocyclic compounds was confirmed. For each of the aromatic heterocyclic compounds, an effective surface area of Pt was calculated from adsorption and desorption amounts of hydrogen, which were observed by cyclic voltammetry (CV), and a Pt surface coverage rate of the aromatic heterocyclic compound was calculated from a changes of the adsorption and desorption amounts of the hydrogen.

Figure 8:
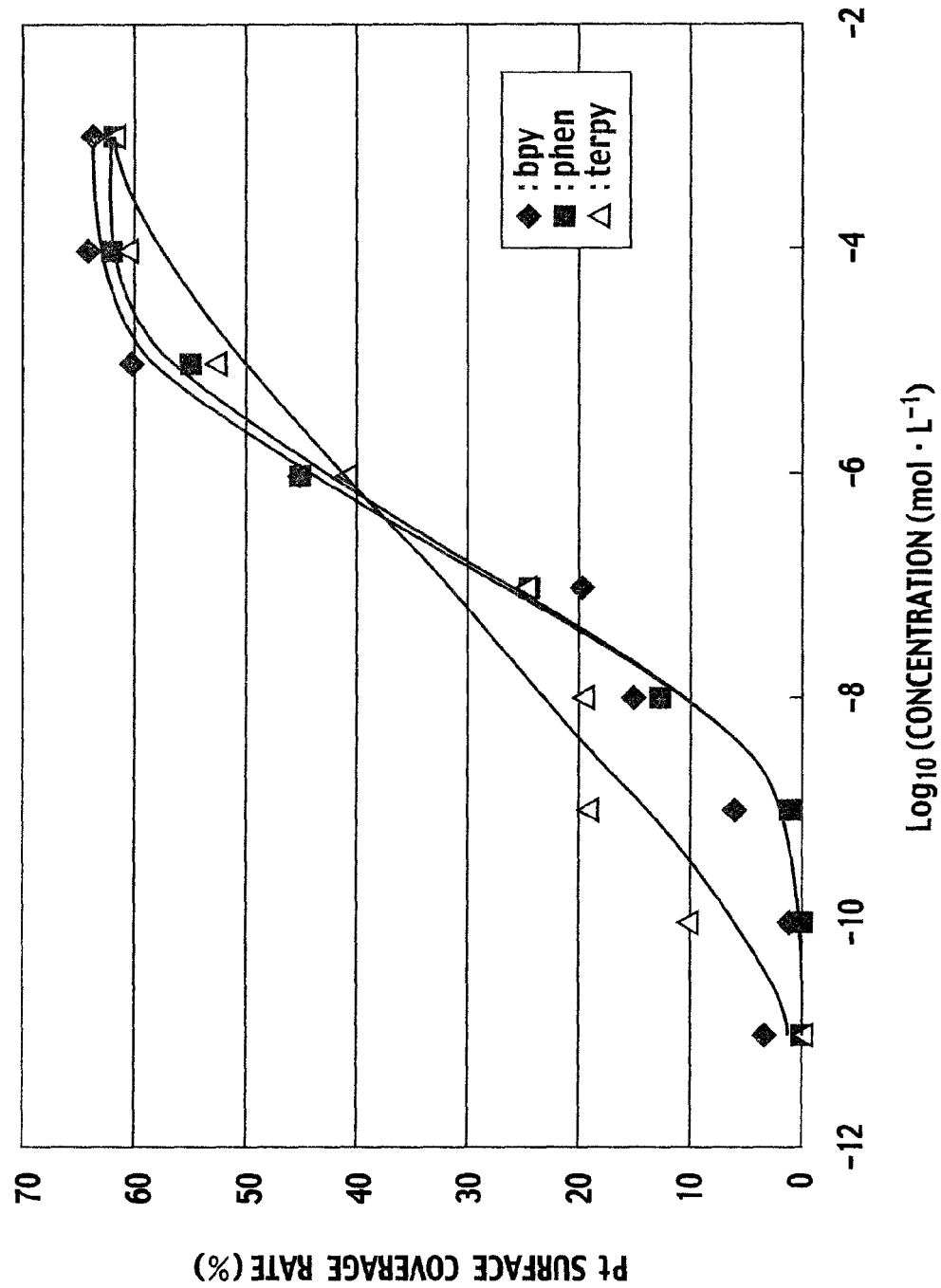
FIG. 8 is a graph showing adsorption isothermal curves of aromatic heterocyclic compounds.

As shown in FIG. 8, isothermal adsorption behaviors in which the respective aromatic heterocyclic compounds were taken as adsorbents were obtained. By using adsorption isotherms of a Temkin type, a Langmuir type and a Freundlich type, adsorption modes of the respective additives were analyzed. Coefficients of determination, which were calculated for each of such isothermal adsorption models, are shown in Table 1. Whichever aromatic heterocyclic compound might be used as the additive, the adsorption mode was able to be expressed excellently by the Temkin type.

The Temkin-type adsorption isotherm is one made on the assumption about heterogeneous on-surface adsorption, and accordingly, it can be guessed that the additives observed herein are also adsorbed heterogeneously on the Pt surfaces.

TABLE 1

|  | bpy | phen | terpy |
|---|---|---|---|
| Temkin type | 0.98 | 0.99 | 0.96 |
| Langmuir type | 0.95 | 0.96 | 0.77 |
| Freundlich type | 0.86 | 0.55 | 0.82 |

Still further, it is preferable that the above-described aromatic heterocyclic compound be used by an appropriate amount within a range at which the aromatic heterocyclic compound does not largely affect power generation characteristics in the case of being used for the fuel cell. Specifically, the above-described aromatic heterocyclic compound can be adsorbed and coordinated on 20 to 70% of platinum, rhodium, or palladium, and those according to the arbitrary combinations of these, which are exposed to the surface of the above-described metal catalyst, and more preferably, the above-described aromatic heterocyclic compound can be adsorbed and coordinated on 30 to 60% thereof. Note that, if the adsorption amount meets less than 20% of the above-described catalyst component, then it becomes difficult for the aromatic heterocyclic compound to fully exert the effect of suppressing the dissolution of the catalyst component (Pt, Rh, Pd and the like) in the metal catalyst. Meanwhile, if the adsorption amount meets more than 70% of the catalyst component, then the aromatic heterocyclic compound sometimes impairs the catalytic function of the catalyst component (Pt, Rh, Pd and the like) in the metal catalyst. In such a way, a decrease of the catalytic function owing to over coverage with the aromatic heterocyclic compound can be avoided, and the effect of suppressing the dissolution and elution of the catalyst component (Pt, Rh, Pd and the like), which is brought by the adsorption and coordination of the compound, can be exerted with a good balance.

Moreover, the aromatic heterocyclic compound can be adsorbed and coordinated in a ratio of 0.1 to 1.5 nmol/cm$^2$ per unit area of the metal (Pt, Rh, Pd and the like) exposed to the surface of the above-described metal catalyst. In particular, in the case where 2,2'-bipyridine is applied as the aromatic heterocyclic compound, 2,2'-bipyridine can be adsorbed and coordinated within a range of 0.2 to 0.8 nmol/cm$^2$. In such a way, the dissolution and elution of the catalyst metal can be suppressed effectively even if the applied amount of the aromatic heterocyclic compound is extremely small.

Next, an electrocatalyst for an electrochemical cell according to another embodiment in the present invention is composed by allowing coexistence of an aromatic heterocyclic compound and a metal catalyst. Moreover, the above-described aromatic heterocyclic compound has a six-membered ring structure, and a heteroatom in the aromatic heterocyclic compound has a metal coordination capacity that is not directly involved in the electrode reaction. In such a way, in such an electrocatalyst for an electrochemical cell, in comparison with a metal catalyst with which the aromatic heterocyclic compound does not coexist, the rising potential in the oxidation reaction of the metal catalyst itself, which is observed in the current-potential behavior, is shifted to the high potential side, or the oxidation peak of the metal catalyst itself is reduced. Hence, the durability against the dissolution of the catalyst metal is enhanced.

Here, it is preferable that the above-described metal catalyst be platinum, rhodium or palladium, those according to the arbitrary combinations of these, and alloys of these. Specifically, there are mentioned the metal catalysts using the platinum powder, the platinum-supported carbon, the platinum-ruthenium alloy-supported carbon, the platinum-iron alloy-supported carbon, the platinum-cobalt alloy-supported carbon, the platinum black electrode, the platinum mesh, the platinum-rhodium alloy-supported carbon, the platinum-palladium alloy-supported carbon, the palladium-rhodium alloy-supported carbon, and the like.

Moreover, besides the above, as the metal catalysts, there are mentioned those belonging to the fourth to sixth periods, preferably those belonging to the groups IV to XII, more preferably those belonging to the groups VI to XI. Typically, gold (Au), silver (Ag), osmium (Os), iridium (Ir) and the like can be used.

Note that, from a viewpoint of maintaining the electron conductivity, for example, the carbon fine particles (carbon black, fullerene and the like), the fine carbon fibers (carbon nanotube and the like), tungsten carbide and molybdenum carbide can be used in combination with the above-described metal catalyst.

Moreover, a similar one to the above-mentioned aromatic heterocyclic compound can be used as the aromatic heterocyclic compound in this embodiment. Specifically, an aromatic heterocyclic compound can be used, which is adsorbed and coordinated on 20 to 70%, more preferably 30 to 60% of platinum, rhodium, or palladium, and those according to the arbitrary combinations of these, which are exposed to the surface of the above-described metal catalyst. If such an adsorption amount meets less than 20% of the above-described catalyst component, then it becomes difficult for the aromatic heterocyclic compound to fully exert the effect of suppressing the dissolution of the catalyst component (Pt, Rh, Pd and the like) in the metal catalyst. Meanwhile, if the adsorption amount meets more than 70% of the catalyst component, then the aromatic heterocyclic compound sometimes impairs the catalytic function of the catalyst component (Pt, Rh, Pd and the like) in the metal catalyst.

Moreover, the aromatic heterocyclic compound can be adsorbed and coordinated in the ratio of 0.1 to 1.5 nmol/cm$^2$ per unit area of the metal (Pt, Rh, Pd and the like) exposed to the surface of the above-described metal catalyst. In particular, in the case where 2,2'-bipyridine is applied as the aromatic heterocyclic compound, 2,2'-bipyridine can be adsorbed and coordinated within the range of 0.2 to 0.8 nmol/cm$^2$. In such a way, the dissolution and elution of the catalyst metal can be suppressed effectively even if the applied amount of the aromatic heterocyclic compound is extremely small.

Next, a description will be made in detail of a method for producing the electrocatalyst for an electrochemical cell based on application thereof to the fuel cell. In the case of producing the above-described electrocatalyst for an electrochemical cell, the following steps are performed, which are:
1. the step of dissolving the above-described aromatic heterocyclic compound in a solvent into a predetermined concentration;
2. the step of dispersing a metal catalyst, on which metal having a metal oxidation potential of 0.5V or higher to 1.5V or lower is supported, into a solution in which the above-described aromatic heterocyclic compound is dissolved;
3. the step of mixing and stirring a solution into which the metal catalyst is dispersed; and
4. the step of taking out and drying the metal catalyst on which the aromatic heterocyclic compound is adsorbed and coordinated. By the steps as described above, the above-described electrocatalyst for an electrochemical cell can be produced easily at low cost.

Note that, as methods for modifying the catalyst metal and the aromatic heterocyclic compound, it is possible to appropriately apply methods which are known in public. Typically, in the first step, the aromatic heterocyclic compound can be prepared into a solution with a concentration of 0.1 µmol/L to 50 µmol/L though depending on a type of the aromatic heterocyclic compound. In the second step, the metal having the metal oxidation potential of 0.5V or higher to 1.5V or lower can be dispersed by an amount ranging from 1 to 100 g/L. In the third step, the solution can be fully mixed and dispersed by using an ultrasonic homogenizer. Alternatively, a magnetic stirrer and the like may be used. In the drying in the fourth step, for example, drying by natural drying, an evaporation to dryness method, a rotary evaporator, a spray drying machine and a drum dryer, and the like can be used. A drying time just needs to be appropriately selected in response to the method for use.

Note that, as the solvent for dispersing the above-described aromatic heterocyclic compound and the catalyst on which the metal having the metal oxidation potential of 0.5V or higher to 1.5V or lower is supported, a known solvent such as distilled water, a sulfuric acid aqueous solution and a perchloric acid aqueous solution can be used. Moreover, as the solvent, there can be applied an organic solvent such as methanol, ethanol, isopropanol, acetone and ethyl acetate, and two or more types thereof may be used by being mixed appropriately.

Next, a description will be made in detail of the electrochemical cell, the single cell of the fuel cell and the fuel cell. Each of the electrochemical cell and the single cell of the fuel cell applies the above-mentioned electrocatalyst for an electrochemical cell to the cathode electrode. As the electrochemical cell, a lithium-ion battery, an electrical double layer capacitor and a dye-sensitized solar cell are mentioned. Moreover, as the electrochemical cell, cells are mentioned, which are for use in a water electrolyzer, a hydrohalic acid electrolyzer, a salt electrolyzer, an oxygen condenser, a humidity sensor and a gas sensor. In addition, the electrochemical cell is also applicable as an exhaust gas purifying catalyst that accelerates the reaction electrochemically. Furthermore, the fuel cell is composed by electrically interconnecting the single cells of the fuel cell in a stacking manner and so on. In such a way, the dissolution and elution of the catalyst component (Pt, Rh, Pd and the like), which occur in the cathode electrode of the polymer electrolyte fuel cell, can be suppressed. Specifically, the elution amount of the catalyst component (Pt, Rh, Pd and the like) can be suppressed by a simple method in which the conventional application mode of the fuel cell is not changed, and by inexpensive measures. Moreover, the excellent durable effect can be exerted with such an extremely small adsorption amount of the aromatic heterocyclic compound, and accordingly, the decrease of the catalytic performance, which follows the adsorption of the aromatic heterocyclic compound to the catalyst metal, can be suppressed.

Moreover, it is preferable to use the electrochemical cell, the single cell of the fuel cell and the fuel cell, which are described above, in a state where a voltage of higher than 0V to 1.2V or lower is applied thereto. When the electrochemical cell, the single cell of the fuel cell and the fuel cell are used in a state where the applied voltage exceeds 1.2V, the aromatic heterocyclic compound adsorbed and coordinated on Pt is electrochemically oxidized and decomposed, and the effect of suppressing the dissolution and elution of the catalyst component (Pt, Rh, Pd and the like) is sometimes reduced.

A description will be made below more in detail of the present invention by examples and comparative examples; however, the present invention is not limited to these examples.

1. Evaluation of Effect of Suppressing Platinum Elution

EXAMPLE 1

The effect of suppressing the elution of the platinum electrode was evaluated by using a dual-chamber electrochemical measuring device.

Pt wires were used as a working electrode and a counter electrode, and a reversible hydrogen electrode (RHE) was used as a reference electrode. Moreover, the counter electrode was placed in another chamber in order to prevent deposition of Pt. The RHE was fabricated in such a manner that a catalyst-suspended solution formed by mixing 20% Pt-XC72R (made by Electrochem Inc.), a Nafion (registered trademark) solution (made by Aldrich Corporation) and water and performing ultrasonic dispersion for an obtained mixture for 30 minutes was injected into a Flemion membrane through which the Pt wire was drawn.

2,2'-bipyridine (made by Wako Pure Chemical Industries, Ltd.) was used as species adsorbed on a surface of the platinum electrode.

As an electrolytic solution, 1.0 M $H_2SO_4$ (made by Wako Pure Chemical Industries, Ltd.: for measuring poisonous metal) was used, and a predetermined amount thereof was set on the working electrode side. A catalyst was deteriorated by an accelerated test in which cyclic voltammetry was performed by a fixed number of cycles. Thereafter, the solution was sampled, and an elution amount of Pt was measured by using ICP atomic emission spectrometry.

Conditions were fixed so that a scan speed could be 8.0 V/s, the number of cycles could be 105 cycles, a lower-limit voltage value could be 0.4V, and an upper-limit voltage value could be 1.1V. Moreover, an added concentration of bpy to the electrolytic solution was set at 100 μM.

Moreover, as a reference experiment, an elution amount when the Pt wire was only immersed into the electrolytic solution was measured, and it was confirmed that Pt was not eluted in the reference experiment.

EXAMPLE 2

Similar operations to those of Example 1 were repeated except that the added concentration of bpy to the electrolytic solution was reduced to 10 μM, whereby a metal catalyst of this example was obtained, and was evaluated.

EXAMPLE 3

Similar operations to those of Example 1 were repeated except that the added concentration of bpy to the electrolytic solution was reduced to 1 μM, whereby a metal catalyst of this example was obtained, and was evaluated.

EXAMPLE 5

Similar operations to those of Example 1 were repeated except that, in place of bpy, 1,10-phenanthroline (phen) was added at a concentration of 100 μM to the electrolytic solution, whereby a metal catalyst of this example was obtained, and was evaluated.

EXAMPLE 6

Similar operations to those of Example 1 were repeated except that, in place of bpy, the 1,10-phenanthroline (phen) was added at a concentration of 10 μM to the electrolytic solution, whereby a metal catalyst of this example was obtained, and was evaluated.

EXAMPLE 7

Similar operations to those of Example 1 were repeated except that, in place of bpy, the 1,10-phenanthroline (phen) was added at a concentration of 1 μM to the electrolytic solution, whereby a metal catalyst of this example was obtained, and was evaluated.

EXAMPLE 8

Similar operations to those of Example 1 were repeated except that, in place of bpy, terpyridine (terpy) was added at a concentration of 100 μM to the electrolytic solution, whereby a metal catalyst of this example was obtained, and was evaluated.

EXAMPLE 9

Similar operations to those of Example 1 were repeated except that, in place of bpy, the terpyridine (terpy) was added at a concentration of 10 μM to the electrolytic solution, whereby a metal catalyst of this example was obtained, and was evaluated.

COMPARATIVE EXAMPLE 1

Similar operations to those of Example 1 were repeated except that the added concentration of bpy to the electrolytic solution was set at 0 μM, whereby a metal catalyst of this example was obtained, and was evaluated.

TABLE 2

| | Adsorbent | Concentration (μM) | Coverage rate (%) | Elution amount (%) |
|---|---|---|---|---|
| Example 1 | bpy | 100 | 59 | 17 |
| Example 2 | bpy | 10 | 55 | 26 |
| Example 3 | bpy | 1 | 36 | 19 |
| Example 5 | phen | 100 | 62 | 4 |
| Example 6 | phen | 10 | 55 | 7 |
| Example 7 | phen | 1 | 46 | 49 |
| Example 8 | terpy | 100 | 44 | 3 |
| Example 9 | terpy | 10 | 41 | 91 |
| Comparative example 1 | — | — | — | 100 |

<Performance Evaluation>

1-1. Behavior Confirmation of Pt Elution

Figure 9:
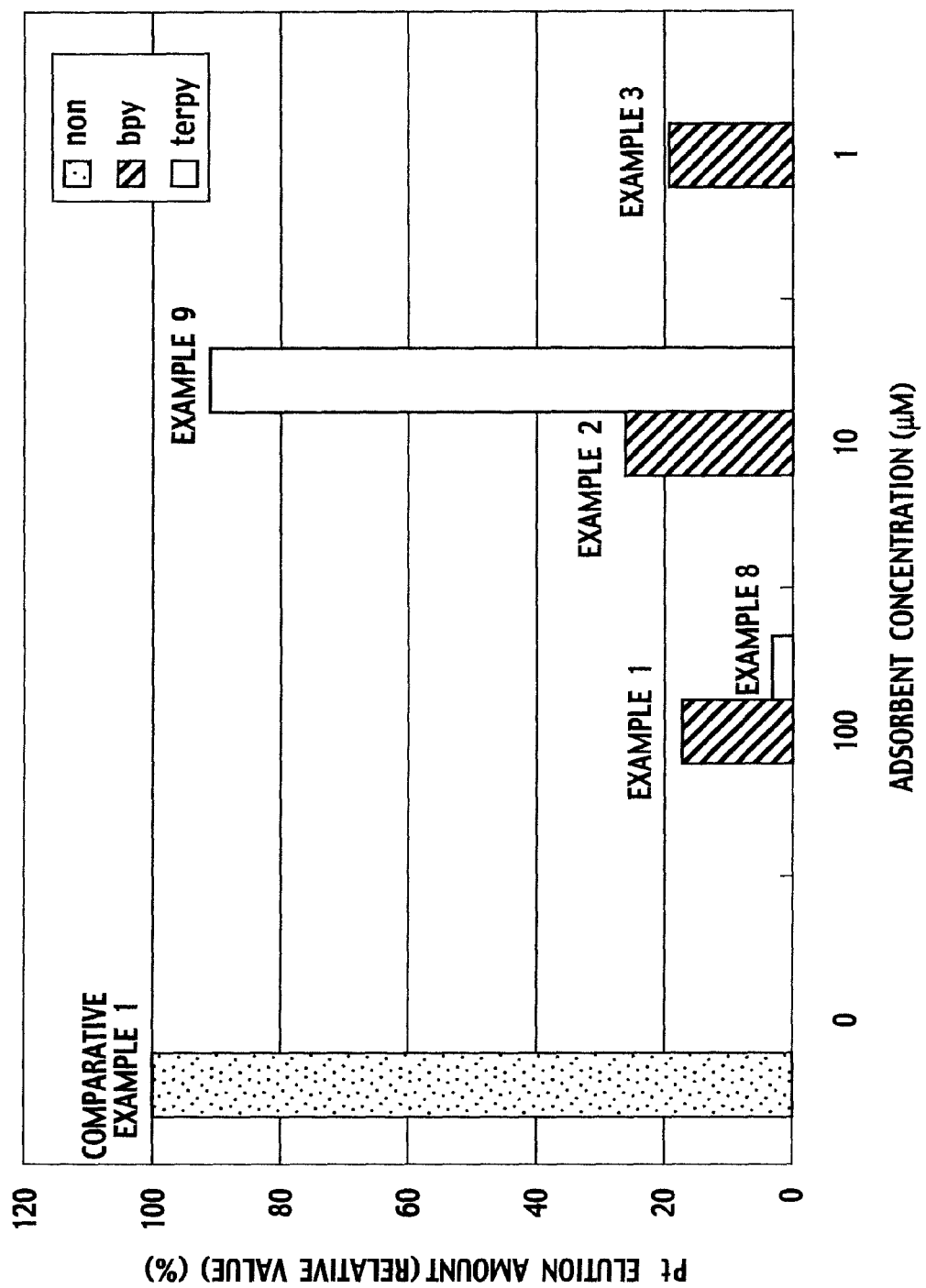
FIG. 9 is a graph showing relationships between adsorbent concentrations and Pt elution amounts.

It was able to be confirmed that, as shown in a graph of FIG. 9, the elution amount of the Pt electrode was reduced in such a manner that the aromatic heterocyclic compound was adsorbed and coordinated on the Pt electrode. From the above, it was understood that the aromatic heterocyclic compound coexisted with the Pt electrode had the function to suppress the elution of Pt. In particular, bpy exerted a sufficient effect even if the added concentration thereof was 1 μM. Such a high effect was able to be obtained in such a manner that an extremely small amount of the aromatic heterocyclic compound was made to coexist with the Pt electrode.

1-2. Adsorption Area of Aromatic Heterocyclic Compound on Pt and Pt Elution Suppression Effect of the Aromatic Heterocyclic Compound An adsorption amount of the aromatic heterocyclic compound on the Pt catalyst was measured for each of Examples 1 to 3. With regard to the measurement, adsorption/desorption electric amounts of hydrogen were obtained from a cyclic voltammetry (CV) curve obtained by performing potential scanning at 0.1 V/s between 0.07V and 0.6V in a 1.0 M $H_2SO_4$ electrolyte. Then, the above-described adsorption amount was calculated from a difference between such hydrogen adsorption/desorption amounts measurable on the Pt electrode and corresponding values obtained in comparative example 1.

Figure 10:
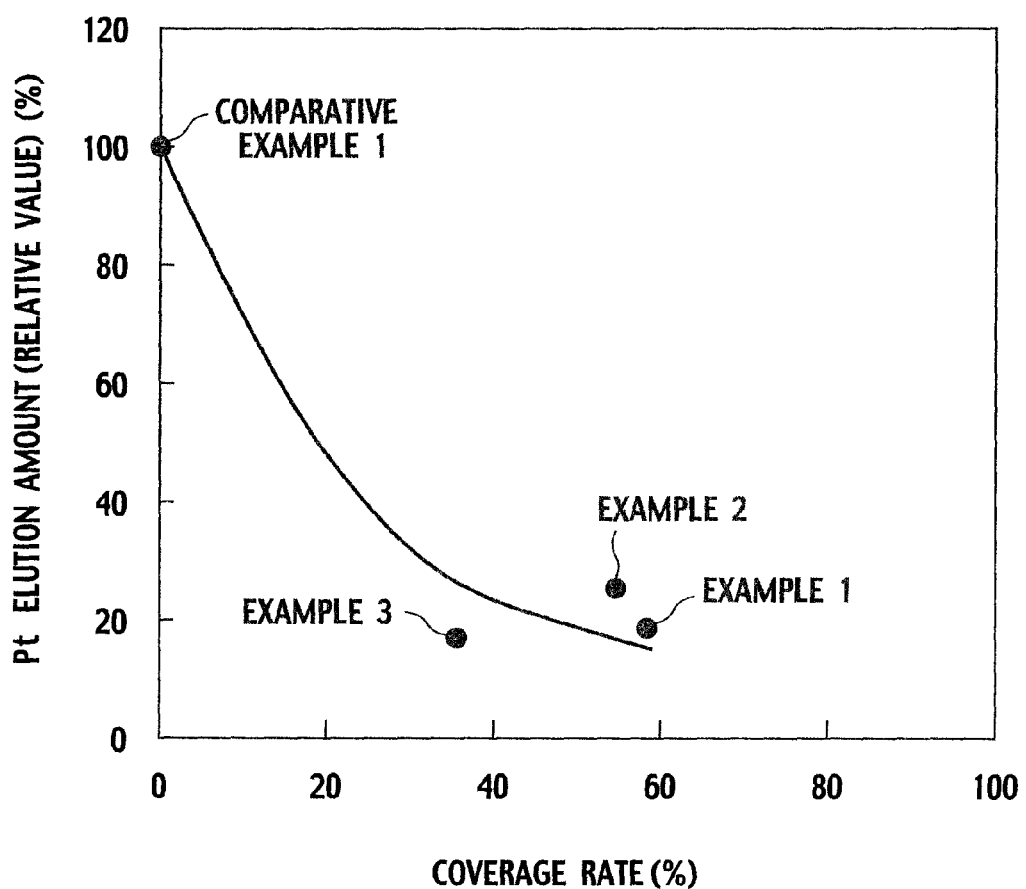
FIG. 10 is a graph showing a relationship between adsorption amounts (area amounts) of the aromatic heterocyclic compounds and the Pt elution amounts.

As shown by a graph of FIG. 10, in each of Examples 1 to 3, a behavior that allows the exertion of the effect of suppressing the elution of Pt was exhibited even if the adsorption amount of the aromatic heterocyclic compound was extremely small. Such a Pt elution suppression effect was exhibited within a range where the coverage rate was 20% to 70%. Meanwhile, it was understood that the Pt elution was not able to be suppressed in Comparative example 1 where the adsorption amount was 0.

1-3. Adsorption Concentration of Aromatic Heterocyclic Compound on Pt and Pt Elution Suppression Effect of the Aromatic Heterocyclic Compound An adsorption amount of the aromatic heterocyclic compound on the Pt catalyst was calculated based on the adsorption amount obtained above in each of Examples 1 to 3. The calculation was performed for pyridine as a monocyclic aromatic compound and bipyridine as a bicyclic aromatic compound.

Figure 11:
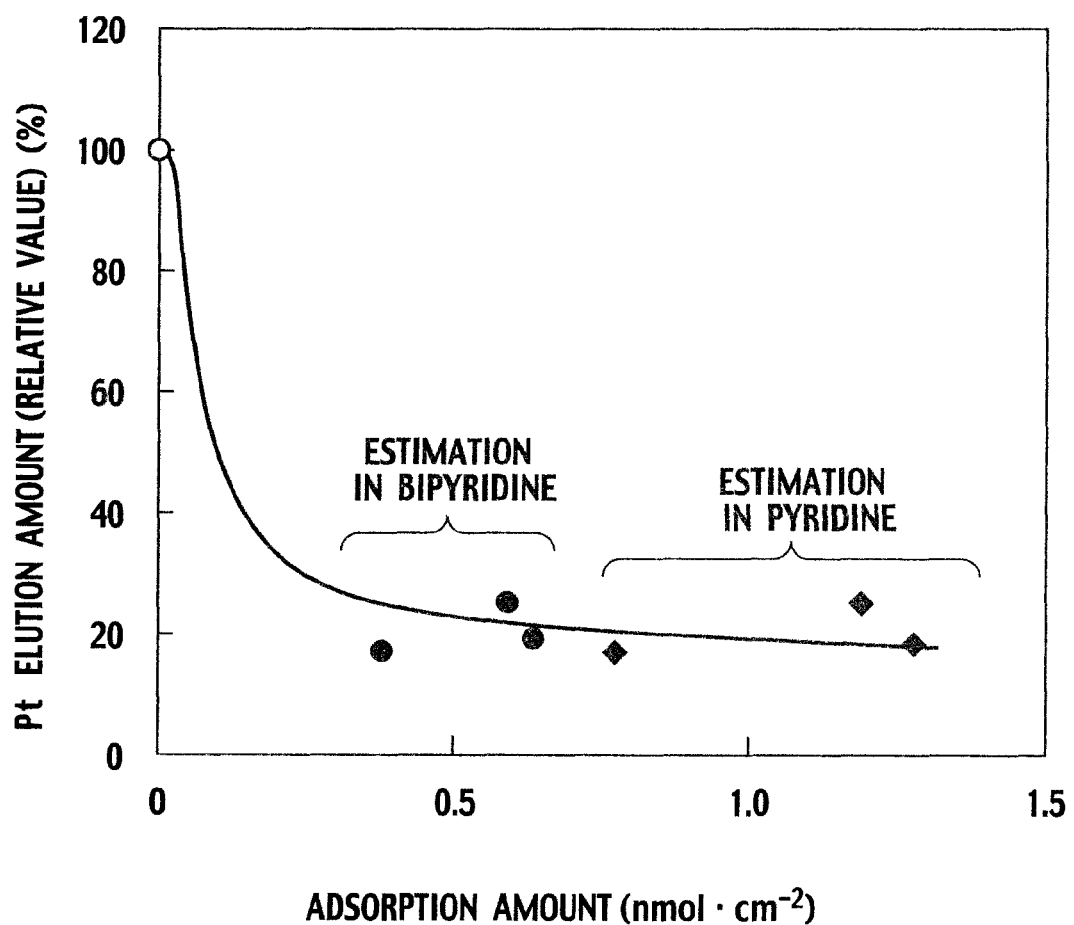
FIG. 11 is a graph showing a relationship between adsorption amounts (molar amounts) of the aromatic heterocyclic compounds and the Pt elution amounts.

As shown by a graph of FIG. 11, a behavior that allows the exertion of the effect of suppressing the elution of Pt was exhibited even if the adsorption amount of the aromatic heterocyclic compound was extremely small. It was understood that the bicyclic aromatic compound was superior to the monocyclic aromatic compound in such a Pt elution suppression effect.

1-4. Influence of Voltage Application

Figure 12:
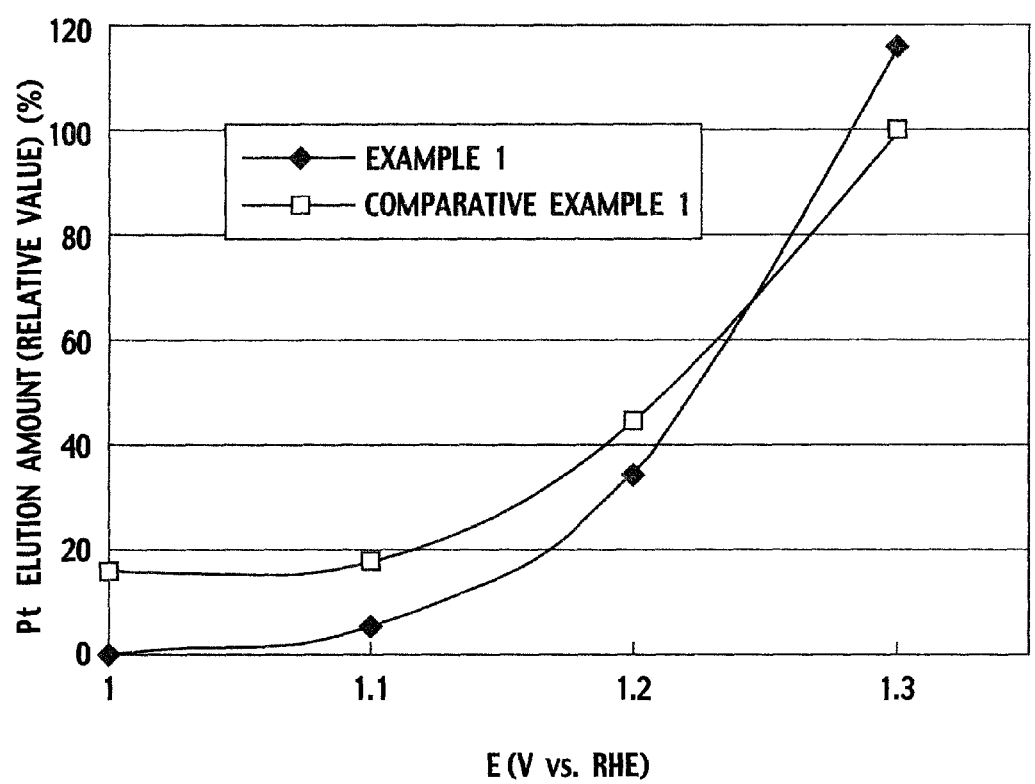
FIG. 12 is a graph showing relationships between applied voltages and the Pt elution amounts.

In order to observe withstand voltage characteristics of the aromatic heterocyclic compound adsorbed to Pt, a change of the Pt elution amount owing to voltage application was obtained for each of the metal catalysts of Example 1 and Comparative example 1. Results are shown in FIG. 12. Note that the Pt elution amount in Comparative example when a potential of 1.3V was applied thereto was defined as 100%, and data regarding the respective Pt elution amounts was organized by relative values obtained by taking that value as a reference.

It is understood that, in the Pt catalyst of Example 1, the Pt elution amount is suppressed up to 1.2V as an upper limit in comparison with Comparative example. From this, it is understood that the Pt metal catalyst of Example 1 is applicable as the cathode electrode for the fuel cell.

2. Evaluation in Form of Fuel Cell

EXAMPLE 4

A catalyst for the fuel cell was prepared in accordance with the following procedures, and power generation evaluation was performed therefor.

For the evaluation, a graphite cell FC05-01SP (made by Electrochem Inc.) was used. As an electrode, a 38% platinum-supported carbon catalyst (made by Tanaka Kikinzoku Kogyo K. K.) was used.

First, a solution was prepared, in which bpy was dissolved into 20 parts by weight of a 1.0 M sulfuric acid aqueous solution so that a concentration of bpy could be 10 μM. 1 part by weight of the 38% platinum-supported carbon catalyst was added to the prepared solution, and the aromatic heterocyclic compound was adsorbed onto the platinum catalyst. In the obtained platinum catalyst, the adsorption amount of the aromatic heterocyclic compound was 53%.

Subsequently, the platinum-supported catalyst with which the aromatic heterocyclic compound coexisted, glycerol, water and a Nafion (registered trademark) solution were mixed together, followed by ultrasonic stirring, whereby catalyst ink was obtained. Note that a composition of the ink was set as follows with respect to 1 part by weight of the platinum-supported carbon catalyst: the glycerol: 2 parts by weight; the water: 3 parts by weight; and the 5% Nafion (registered trademark): 3 parts by weight. This catalyst ink was applied on carbon paper so that an amount of platinum could be 1 mg/cm$^2$, and was dried at 120° C. overnight, whereby carbon paper added with a catalyst layer was fabricated.

Figure 13:
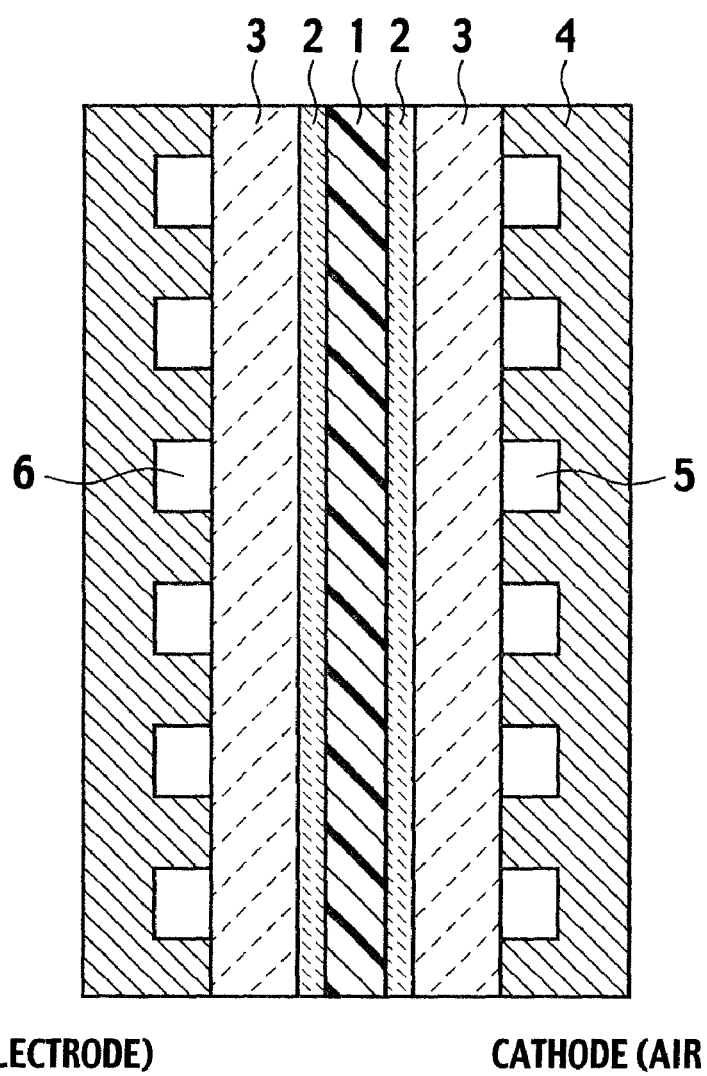
FIG. 13 is a schematic cross-sectional view showing an example of a single cell of a polymer electrolyte fuel cell.

Next, a single cell of a fuel cell using the above-described carbon paper with the catalyst layer was fabricated. First, as shown in FIG. 13, Nafion 1135 was used as an electrolyte membrane 1, and on both surfaces thereof, pieces of metal catalyst-applied carbon paper 2 (catalyst electrode layers 2) fabricated as described above were arranged so as to sandwich the electrolyte membrane 1, whereby a membrane electrode assembly (MEA) was fabricated. Moreover, gas diffusion layers (GDLs) 3 and separators 4 were arranged on the MEA, and a cell was assembled. Note that, in FIG. 13, reference numeral 5 denotes an oxidant gas flow passage, and reference numeral 6 denotes a fuel gas flow passage.

COMPARATIVE EXAMPLE 2

Similar operations to those in Example 4 were repeated except for performing no adsorption treatment of the aromatic heterocyclic compound for the metal catalyst, whereby catalyst ink was prepared, and a cell was assembled.

<Performance Evaluation>

Figure 14:
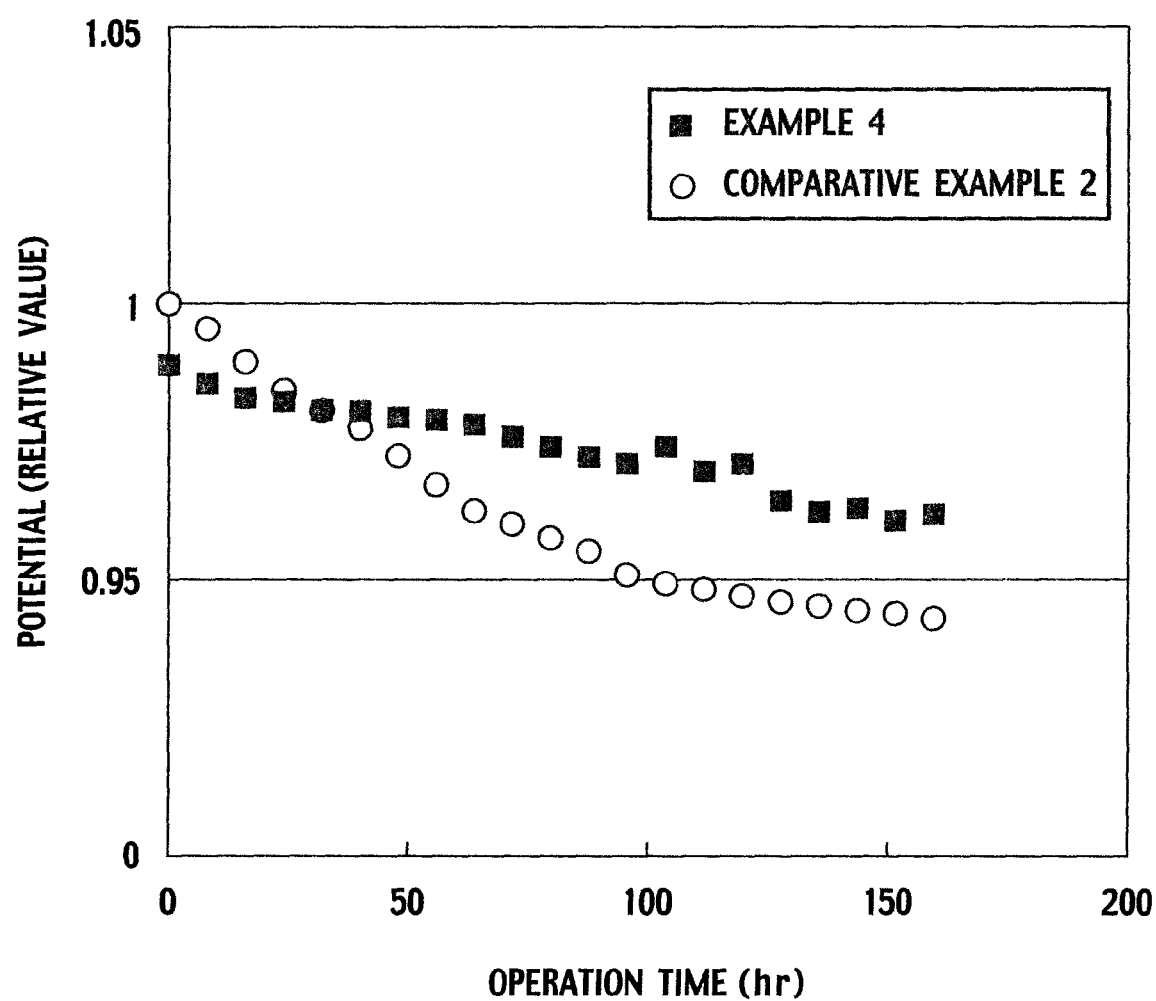
FIG. 14 is a graph showing results of durability tests in Example 4 and Comparative example 2.

Evaluation of power generation characteristics was performed by flowing hydrogen and oxygen, in each of which a temperature and a humidity were controlled, into the cell, and measuring a cell voltage with respect to a value of a current flowing between electrodes located on both ends of the cell. FIG. 14 shows the power generation characteristics of the cell assembled in Example 4. This graph is formed by plotting a change of the cell potential when a current of which value was 500 mA/cm$^2$ was flown. Note that relative values of the respective potentials were shown by taking, as a reference, a potential in Comparative example 2, which was measured when the evaluation was started. As shown in the graph of FIG. 14, it was able to be confirmed that the single cell of the fuel cell obtained in Example 4 exerted a sufficient effect even in a continuous operation in comparison with the single cell of the fuel cell obtained in Comparative example 2.

The entire contents of Japanese Patent Application No. 2006-098328 (filed on: Mar. 31, 2006), Japanese Patent Application No. 2006-248154 (filed on: Sep. 13, 2006) and Japanese Patent Application No. 2007-81766 (filed on: Mar. 27, 2007) are incorporated herein by reference.

The description has been made above of the contents of the present invention along the embodiments and the examples; however, the present invention is not limited to the description of these embodiments and examples, and for those skilled in the art, it is self-evident that a variety of modifications and improvements are possible.

INDUSTRIAL APPLICABILITY

In accordance with the present invention, the aromatic heterocyclic compound is adsorbed and coordinated on the surface of the metal catalyst. Accordingly, there can be provided the electrocatalyst for an electrochemical cell, which is capable of enhancing the durability against the dissolution and elution of the catalyst metal, the method for producing the electrocatalyst, the electrochemical cell, the single cell of the fuel cell using the electrochemical cell, and the fuel cell using the electrochemical cell.

The invention claimed is:

1. An electrocatalyst for an electrochemical cell, comprising:
   a metal catalyst which contains metal having a metal oxidation potential of 0.5V or higher to 1.5V or lower, the metal being directly involved in an electrode reaction; and
   an aromatic heterocyclic compound which has a six-membered ring structure containing a heteroatom, the heteroatom having a metal coordination capacity that is not directly involved in the electrode reaction, wherein the aromatic heterocyclic compound is heterogeneously adsorbed and coordinated on a surface of the metal catalyst while interposing the heteroatom therebetween, and wherein the aromatic heterocyclic compound coordinated in a ratio of 0.1 to 1.5 nmol/cm$^2$ per unit area of the metal exposed to the surface of the metal catalyst.

2. The electrocatalyst for an electrochemical cell according to claim 1, wherein the metal that has the oxidation potential is metal belonging to fourth to sixth periods of the Periodic Table.

3. The electrocatalyst for an electrochemical cell according to claim 1, wherein the metal that has the oxidation potential is metal belonging to groups IV to XII of the Periodic Table.

4. The electrocatalyst for an electrochemical cell according to claim 1, wherein the metal that has the oxidation potential is metal belonging to groups VI to XI of the Period Table.

5. The electrocatalyst for an electrochemical cell according to claim 1, wherein the metal catalyst is at least one selected from the group consisting of platinum, rhodium and palladium, and/or alloys of these.

6. The electrocatalyst for an electrochemical cell according to claim 1, wherein the aromatic heterocyclic compound is adsorbed and coordinated on 20 to 70% of the at least one selected from the group consisting of platinum, rhodium and palladium, and/or the alloys of these, which are exposed to the surface of the metal catalyst.

7. The electrocatalyst for an electrochemical cell according to claim 1, wherein the aromatic heterocyclic compound is adsorbed and coordinated on 30 to 60% of the at least one selected from the group consisting of platinum, rhodium and palladium, and/or the alloys of these, which are exposed to the surface of the metal catalyst.

8. The electrocatalyst for an electrochemical cell according to claim 1, wherein the heteroatom contained in the aromatic heterocyclic compound is a nitrogen atom.

9. The electrocatalyst for an electrochemical cell according to claim 1, wherein the aromatic heterocyclic compound is a pyridine derivative.

10. The electrocatalyst for an electrochemical cell according to claim 9, wherein the pyridine derivative is at least one derivative selected from the group consisting of bipyridines, terpyridines and phenanthrolines.

11. The electrocatalyst for an electrochemical cell according to claim 9, wherein the pyridine derivative is 2,2'-bipyridine.

12. An electrocatalyst for an electrochemical cell, comprising:

a metal catalyst which contains metal that is directly involved in an electrode reaction; and an aromatic heterocyclic compound that is adsorbed on the surface of the metal catalyst and which has a six-membered ring structure containing a heteroatom, the heteroatom having a metal coordination capacity that is not directly involved in the electrode reaction, wherein, in comparison with a metal catalyst with which the aromatic heterocyclic compound does not exist, a rising potential in an oxidation reaction of the metal catalyst itself, which is observed in a current-potential behavior, is shifted to a high potential side, or an oxidation peak of the metal catalyst itself is reduced, and wherein the aromatic heterocyclic compound is coordinated in a ratio of 0.1 to 1.5 nmol/cm$^2$ per unit area of the metal exposed to the surface of the metal catalyst.

13. The electrocatalyst for an electrochemical cell according to claim 12, wherein the aromatic heterocyclic compound is adsorbed and coordinated on 20 to 70% of at least one selected from the group consisting of platinum, rhodium and palladium, and/or alloys of these, which are exposed to a surface of the metal catalyst.

14. A method for producing an electrocatalyst for an electrochemical cell according to claim 1, the method comprising:

dissolving the aromatic heterocyclic compound in a solvent into a predetermined concentration;

dispersing the metal catalyst, on which the metal having the metal oxidation potential of 0.5V or higher to 1.5V or lower is supported, into a solution in which the aromatic heterocyclic compound is dissolved;

mixing and stirring the solution into which the metal catalyst is dispersed; and taking out and drying the metal catalyst on which the aromatic heterocyclic compound is adsorbed and coordinated.

15. An electrochemical cell, comprising:

as a cathode electrode, an electrocatalyst for an electrochemical cell according to claim 1.

16. The electrochemical cell according to claim 15, wherein the electrocatalyst for an electrochemical cell is used in a state where a voltage of higher than 0V to 1.2V or lower is applied thereto.

17. A single cell of a fuel cell, comprising:

an electrochemical cell according to claim 15; and a solid polymer electrolyte membrane.

18. A fuel cell, comprising:

a single cell of a fuel cell according to claim 17.

* * * * *